J. M. ABRAMS.
TIRE.
APPLICATION FILED MAY 31, 1911.
1,005,122.
Patented Oct. 10, 1911.
2 SHEETS—SHEET 2.
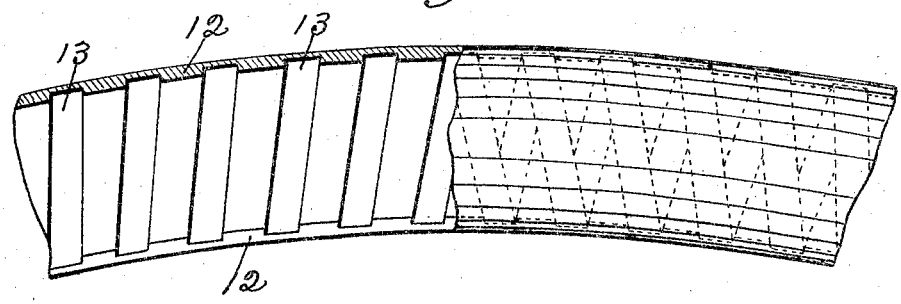
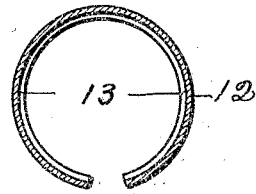
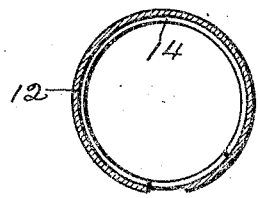
Witnesses:
Frank Nichols
Gunnar Engstrand
Inventor
John M. Abrams
By his Attorneys
Blackwood Bros

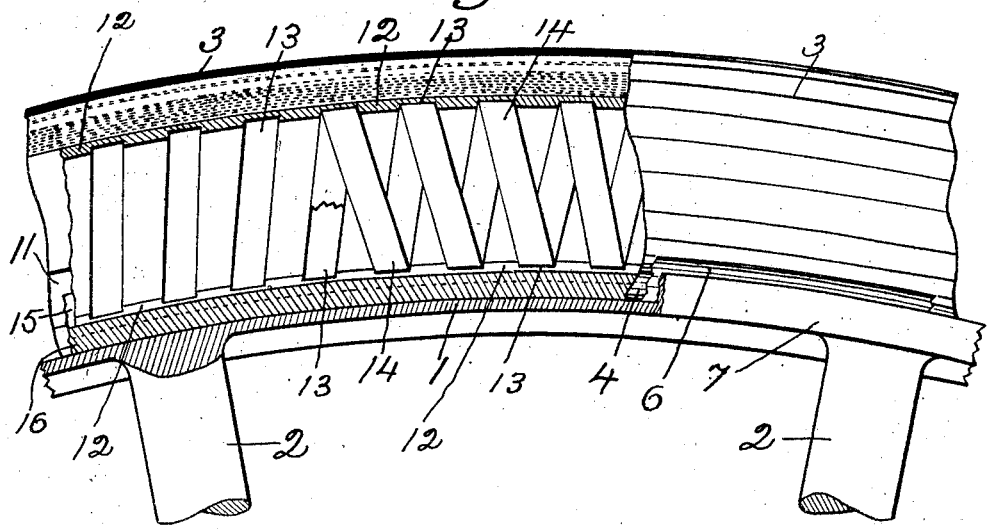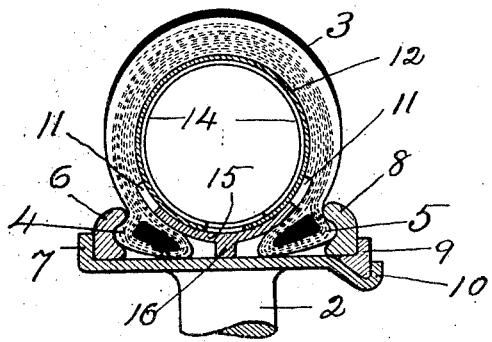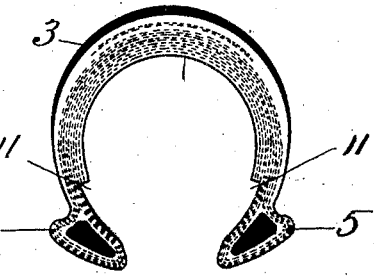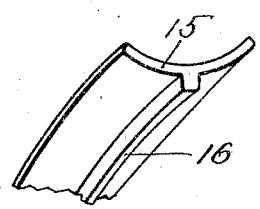

UNITED STATES PATENT OFFICE.

JOHN M. ABRAMS, OF BENTLEY MANOR, NEW YORK.

TIRE.

1,005,122.  Specification of Letters Patent.  Patented Oct. 10, 1911.

Application filed May 31, 1911. Serial No. 630,378.

*To all whom it may concern:*

Be it known that I, JOHN M. ABRAMS, a citizen of the United States, residing at Bentley Manor, in the county of Richmond and State of New York, have invented certain new and useful Improvements in Tires, of which the following is a specification.

My invention relates to tires of that class known as cushion tires.

It has for its object to provide a tire which will possess the advantages of a pneumatic tire in that it is elastic and resilient, but which will avoid the disadvantages of the pneumatic tire in that its elasticity or resiliency are in no wise affected by puncture.

It has for a further object to provide a tire which is more durable, simpler in construction and more easily applied and removed than a pneumatic tire or other cushion tires now in use.

It has for a further object to provide a tire having a spiral metal spring therein to augment the elasticity and resiliency of the outer casing.

It has for a further object to provide a tire of the character described, having a leather tube between the outer casing and spring to prevent injury to the outer casing by contact of the spring therewith and provided with a spiral groove which receives the spring and holds it in place and spaces its convolutions.

It has for a further object to provide a a tire of the character described, having the outer casing split longitudinally, the leather tube split longitudinally and a longitudinal supporting strip located between the outer casing and tube and extending across the space between the longitudinal edges of the casing and tube and is provided with a longitudinal rib extending into the space between the longitudinal edges of the casing.

In the drawings: Figure 1, is a fragmentary sectional view showing my tire applied to a wheel. Fig. 2, a transverse sectional view showing my tire applied to a wheel. Fig. 3, a transverse sectional view of the casing. Fig. 4, a perspective view of a portion of the supporting strip. Fig. 5, a fragmentary sectional view of the tube. Fig. 6, a transverse sectional view of the tube. Fig. 7, a transverse sectional view of the tube and spring therein.

Referring to the drawings illustrating my invention, in which like reference characters designate corresponding parts, 1 designates the rim of a wheel, 2 the spokes and 3 the shoe of a tire, consisting of an outer casing split longitudinally to form two longitudinal edges and provided with lateral longitudinal flanges 4 and 5. The tire is secured to the rim, on one side, by means of a ring 6 which engages the flange 4 of the outer casing and the flange 7 of the rim and secured on the other side by means of a ring 8 which engages the flange 5 of the outer casing and a ring 9 which engages the ring 8 and the flange 10 of the rim. The outer casing 3 is provided with recesses 11 in its interior along its longitudinal edges for the purpose to be hereinafter mentioned.

A leather tube 12 is located in the outer casing 3 and is provided with a spiral groove 13 in its inner circumference in which is seated a metal spiral spring 14. This tube 12, on account of separating the metal spring 14 from the rubber outer casing 3, prevents wear and other injuries to the outer casing which would result from the metal spring contacting therewith, on account of being made of leather forms a tough flexible surface for the metal spring to bear against and on account of being split longitudinally is easily placed on or removed from the spring. The groove 13 in the tube 12 retains the spring 14 therein and spaces its convolutions so that, when pressure is placed on the spring, its convolutions will not be forced together or apart and lessen its spring action.

A longitudinal supporting strip 15, preferably of leather, is located between the tube 12 and the outer casing 3 and extends across the space between the longitudinal edges of the casing and tube into the recesses 11 and is provided with a longitudinal rib 16 which extends into the space between the longitudinal edges of the casing and bears on the rim 1 of the wheel. The strip 15 is made of such length that when its rib 16 is in the center of the space between the longitudinal edges of the casing 3, its ends will extend short of the ends of the slots 11 thus, when it is desired to remove the tire from or secure it on the rim 1, the strip 15 and casing 3 can be forced laterally in the proper direction to allow the ring 9 to be removed or inserted as required. This strip 15 on account of bridging the space between the longitudinal edges of the casing 3, prevents the longitudinal edges of the tube 12 and the spring from sagging or being forced into said space by pressure on the tire and the rib 16 supports the strip 15 so that it will not sag or be forced into said space.

I do not wish to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

I claim:

1. In a tire, an outer casing split longitudinally, a leather tube in said casing having a spiral groove and a spiral spring seated in said groove and its convolutions being spaced thereby, substantially as described.

2. In a tire, an outer casing split longitudinally, a leather tube in said casing split longitudinally and having a spiral groove and a spiral spring seated in said groove and its convolutions being spaced thereby, substantially as described.

3. In a tire, an outer casing split longitudinally and having recesses along its longitudinal edges, a tube in said casing split longitudinally, a spring in said tube, means retaining said spring in said tube and spacing its convolutions and a longitudinal supporting strip located between said casing and tube and extending across the space between the longitudinal edges of said casing and tube into the recesses in said casing, substantially as described.

4. In a tire, an outer casing split longitudinally, a tube in said casing split longitudinally, a spring in said tube, means retaining said spring in said tube and spacing its convolutions and a longitudinal supporting strip located between said casing and tube and extending across the space between the longitudinal edges of said casing and provided with a longitudinal rib extending into the space between the longitudinal edges of said casing and adapted to contact with the rim of a wheel, substantially as described.

In testimony whereof, I have signed my name in the presence of two subscribing witnesses.

JOHN M. ABRAMS.

Witnesses:
R. ROBERTS,
HOWARD BAYNE.